United States Patent [19]

Salter

[11] 4,235,372

[45] Nov. 25, 1980

[54] DIFFUSER

[75] Inventor: Graham R. Salter, Ransomville, N.Y.

[73] Assignee: Textron Inc., Providence, R.I.

[21] Appl. No.: 60,490

[22] Filed: Jul. 25, 1979

[51] Int. Cl.³ .......................... H01S 3/22; B05B 1/14
[52] U.S. Cl. .................................. 239/11; 239/553.5;
331/94.5 G
[58] Field of Search ............ 239/1, 11, 265.19, 553.5,
239/590.5; 331/94.5 C, 94.5 D, 94.5 G, 94.5 P,
94.5 PE; 330/4.3

[56] References Cited

U.S. PATENT DOCUMENTS

| | | | |
|---|---|---|---|
| 3,891,944 | 6/1975 | Lavarini et al. | 331/94.5 G |
| 3,908,175 | 9/1975 | Damm | 331/94.5 G |
| 3,998,393 | 12/1976 | Petty | 239/562 X |
| 4,011,522 | 3/1977 | Falk | 331/94.5 G |

Primary Examiner—Johnny D. Cherry
Assistant Examiner—Gene A. Church
Attorney, Agent, or Firm—Bean, Kauffman & Bean

[57] ABSTRACT

A supersonic diffuser for diffusing a low pressure radially expanding supersonic flow to a subsonic flow of increased pressure. In applications having cylindrical geometries, the diffuser includes a plurality of radially extending, angularly spaced vanes having blunt leading edges which function to generate a detached upstream bow shock.

21 Claims, 6 Drawing Figures

DIFFUSER

TECHNICAL FIELD OF THE INVENTION

The present invention relates generally to diffusers for diffusing radially expanding fluid flows. More specifically, the present invention relates to diffusers for diffusing a radially expanding supersonic flow to a higher pressure subsonic flow. More specifically yet, the diffuser of the present invention relates to a diffuser particularly adapted to diffuse the supersonic radial flows of a cylindrical supersonic radial flow laser.

BACKGROUND OF THE INVENTION

U.S. Pat. No. 4,011,522 as one example, discloses a radial flow laser in which low pressure, high velocity flows are used to form lasing zones of useful length for lasing species having rapid relaxation characteristics. With such lasers, high pumping requirements resulting from the low pressures and high velocities introduce significant weight disadvantages. These weight penalties can be minimized if a diffuser is provided to recover a significant portion of the pressure of the high Mach number, low static pressure flow. The exhaust pumping requirement may then be reduced.

The design of adequate supersonic diffusers is difficult, however, due to the fact, among others, that the Reynolds numbers associated with the lasing species of the supersonic laser are normally low. One prior approach for diffusing radially expanding supersonic flows has been to provide a multiplicity of linear diffusers located circumferentially around the cylindrical nozzle of the cylindrical laser. U.S. Pat. No. 3,998,393 and the references cited therein may be consulted as examples of such conventional linear diffusers which depend on boundary layer growth and probably separation, to create multiple oblique and Lambda shocks which decelerate the supersonic flow to a subsonic Mach number.

In a conventional prior art cylindrical laser, a large number of conventional linear diffusers are arranged around the central cylindrical axis of symmetry like the spokes of a wheel at approximately 4 or 5 degree spacings. To be effective, such conventional linear diffusers require a channel length to height ratio of the order of 10 to 1, making the employment of from 90 to 100 vanes necessary in order to reduce the diffuser diameter to an acceptable size. As a result, the half angle of the leading edges of the vanes is on the order of two degrees or less.

Disadvantages of the above prior art design have become self-evident. First, the sharp leading edges of the vanes cause cooling difficulties. Coolant passages within the vanes must typically be spaced a considerable distance from the sharp leading edge where the temperature is at its greatest. Second, the channel length to height ratio of about 10 in most applications requires vanes of such lengths that the available radial distance is largely used up so as to leave little or no room for further pressure recovery through subsequent subsonic diffusion. Typical diffusers currently being proposed for cylindrical lasers require a ratio of outside diameter to nozzle diameter of approximately 5 to 1 and achieve an 80% (or less) normal shock recovery. And, finally, prior art designs have typically resulted in large, heavy and generally inefficient devices.

THE INVENTION

These and other difficulties and disadvantages of the prior art are overcome by the present invention which accomplishes the functions of pressure recovery and diffusion of a supersonic flow to a subsonic flow by inducing the formation of a shock wave which is substantially normal to the direction of flow. Transition from supersonic to subsonic flow is thus forced to occur through a nearly normal shock. Since the flow downstream of the shock wave is subsonic, the diffuser diameter is determined primarily by the length required to optimize the subsonic diffuser section.

The normal (or nearly normal) shock wave is established by disposing a plurality of obstacles in the path of the radially expanding supersonic flow. Each obstacle is configured to create a detached bow shock upstream therefrom. The obstacles are further angularly spaced one from another so that the detached bow shocks produced thereby coalesce to form a continuous shock which extends across the flow field in a substantially normal manner. The spacing between and profile of each obstacle are selected to both avoid choking and to cause adjacent bow shocks to coalesce with one another in a manner which avoids intersection of the coalesced shock with the sonic lines associated with the obstacles. A plurality of subsonic diffuser vanes may extend downstream of the shock so as to define a plurality of subsonic diffusion channels.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 4 is a schematic representation of the laser diffuser shown in FIGS. 1-3;

DESCRIPTION OF THE BEST MODE OF THE INVENTION

Figure 1:
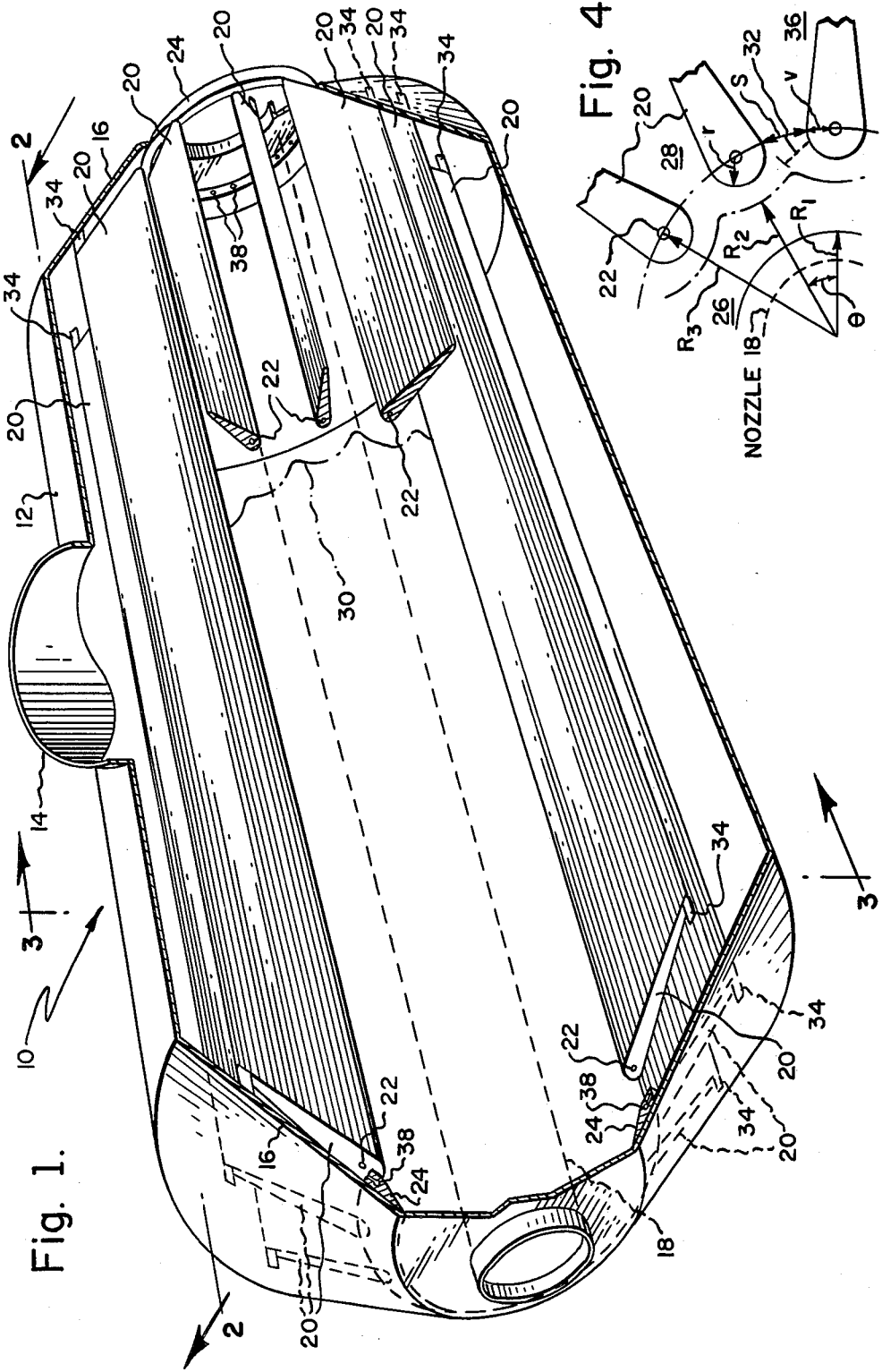
FIG. 1 is a perspective view of the diffuser of the present invention shown in a cylindrical laser application.

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

Turning now to FIG. 1, the diffuser of the present invention is shown in a cylindrical laser application. Generally, the cylindrical laser is indicated in the figure at numeral 10 and consists of an exterior housing 12 having an exit 14 and opposite conically shaped end walls 16. Interior to housing 12 is a central axially extending cylindrical nozzle structure indicated in phantom at 18, the details of which form no portion of the present invention. Nozzle 18 produces an axially extending radially expanding supersonic flow of fluid necessary for the establishment of the lasing zone of the laser. U.S. Pat. No. 4,011,522 may be consulted for an example of a cylindrical nozzle for a radial flow laser.

Figure 3:
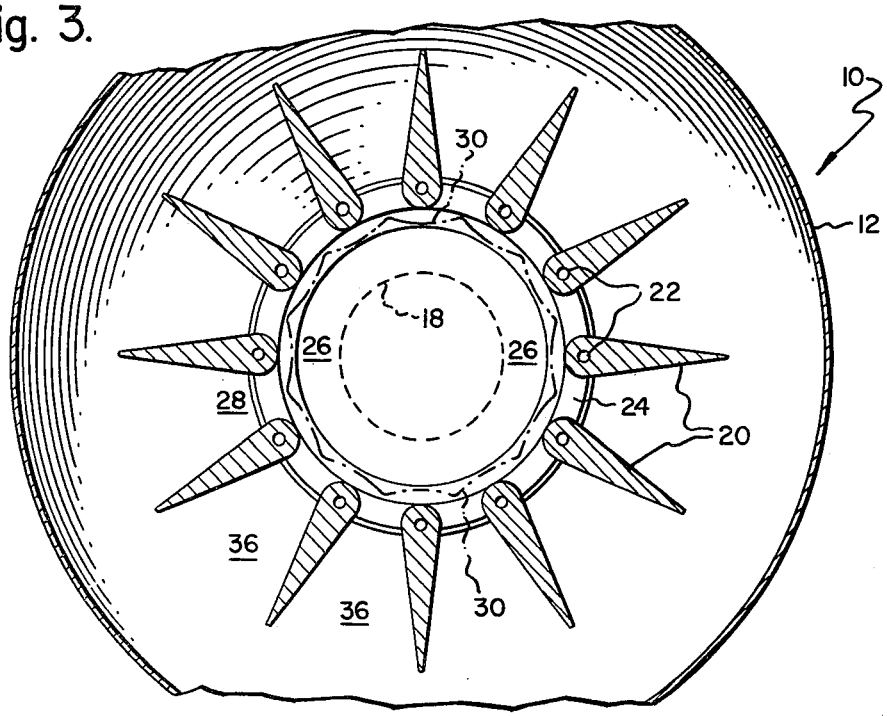
FIG. 3 is an end elevation of the laser diffuser shown in FIG. 1 taken along view lines 3—3.

Turning briefly now to FIG. 3, the diffuser of the present invention may be best visualized. The diffuser consists of a plurality of means 20 disposed in the path of the radially expanding fluid. Means 20, shown as one example and which are illustrative of the preferred embodiment, consist of a number of angularly spaced members of air-foil like vanes which extend in a tapered manner in the downstream direction to define a plurality of subsonic diffusion channels 36. Members 20 are profiled and spaced so as to establish an upstream bow shock wave 30 which is detached from the flow obstruction members 20. As most easily seen in FIG. 3, each member 20 establishes its own bow shock wave which then coalesces with the adjacent bow shock waves of adjacent members so as to create a substantially cylindrical coalesced bow shock wave 30 which is substantially normal to the flow of the fluid passing thereacross. The blunt inwardly directed ends of members 20 are profiled and spaced one from another so as to prevent choking of the flow of the fluid therebetween.

In accordance with the intent of the present invention, coalesced bow shock wave 30 divides the upstream supersonic flow region 26 from the downstream subsonic flow region 28. Thus, as the radially expanding fluid crosses shock 30, it undergoes a supersonic to subsonic transition. In the conventional radially expanding (or cylindrically expanding) geometry, the subsonic flow would rapidly reaccelerate, due to the continuing radial expansion, to once again become a supersonic flow. In the illustrated geometry, reacceleration to this degree is prevented by the presence of adjacent vanes 20. As long as adjacent bow shock waves intersect and coalesce one with another upstream of the sonic lines (for example see numbers 32 in FIG. 4) which would exist for each flow obstruction if it were not for the presence of a neighboring vane 20, reestablishment of a supersonic flow is avoided.

In order to prevent flow separation from the surfaces of vanes 20 while maintaining the desired characteristics of an efficient subsonic diffuser having high pressure recovery, it is deemed desirable that the ratio of diffuser outlet area to diffuser inlet area be maintained at a value of three (3) or less. One expedient which may be suitably practiced to accomplish this end is to provide an exterior housing 12 with conical end walls 16 as shown in the figures. With such an arrangement, the subsonic diffusion channels 36 defined by adjacent vanes 20 and end walls 16, cause the subsonically flowing fluid to undergo a radial expansion and a simultaneous axial compression. Another possible, although perhaps less desirable expedient, would be the insertion of a wedge shaped vane intermediate each vane 20 so as to limit the degree of radial expansion in each channel defined thereby. Of course, in either circumstance, the total number of vanes 20 and the radial dimensions of the channels 36 will have an influence on these factors.

Figure 2:
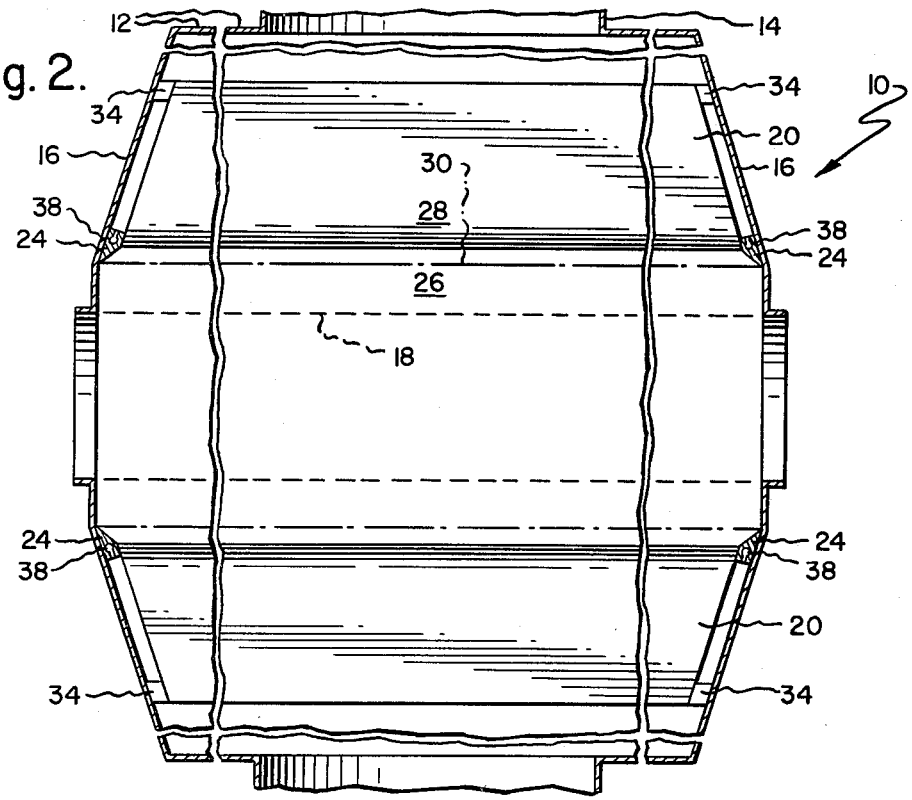
FIG. 2 is a side elevation of the laser diffuser shown in FIG. 1 taken along view lines 2—2.

As best seen in FIG. 2, vanes 20 are mounted on the interior of housing 12 by wedge shaped members 24 and 34, which are tapered with their pointed ends facing upstream. Member 24 takes the form of a continuous ring extending through 360° and includes flow distribution means therein for the distribution of a coolant such as helium. Downstream pointing supersonic nozzles in member 24 serve to establish a coolant flow that controls the boundary layer conditions along conical end walls 16. Coolant channels 22 may also be provided through the blunt ends of vanes 20 so as to prevent their overheating. The blunt profile readily accommodates channels 22 in the present embodiment in contrast to prior art cylindrical laser diffusers which incorporate sharp, narrow leading edges which are difficult to adequately cool.

EXAMPLE

FIG. 4 has been included to aid in the following presentation of a design example of the present invention. In FIG. 4, $R_1$ is the radial dimension of the exit of the lasing cavity, $R_2$ is the locus of the bow shock apices, $R_3$ is the locus of the centers of the vane leading edge radii, r is the radius of the profile of the vane leading edge, S is the passage throat width intermediate adjacent vanes 20 and N is the number of vanes 20 evenly angularly spaced around the laser central cavity.

In the example, it is assumed that the flow conditions at $R_1$ are known. Thus $M_1$, the Mach number of the radially expanding fluid having a known specific heat capacity $\gamma$ is known.

In order to determine conditions at $R_2$, the area ratio function is used to calculate $M_2$, the Mach number of the radially expanding fluid as it approaches the bow shock 30. The area ratio function is as follows:

$$\frac{1}{M_2}(1 + \frac{\gamma - 1}{2} M_2^2)^{\frac{\gamma+1}{2(\gamma-1)}} = \frac{1}{M_1} \frac{R_2}{R_1} (1 + \frac{\gamma - 1}{2} M_1^2)^{\frac{\gamma+1}{2(\gamma-1)}}$$

Figure 6:
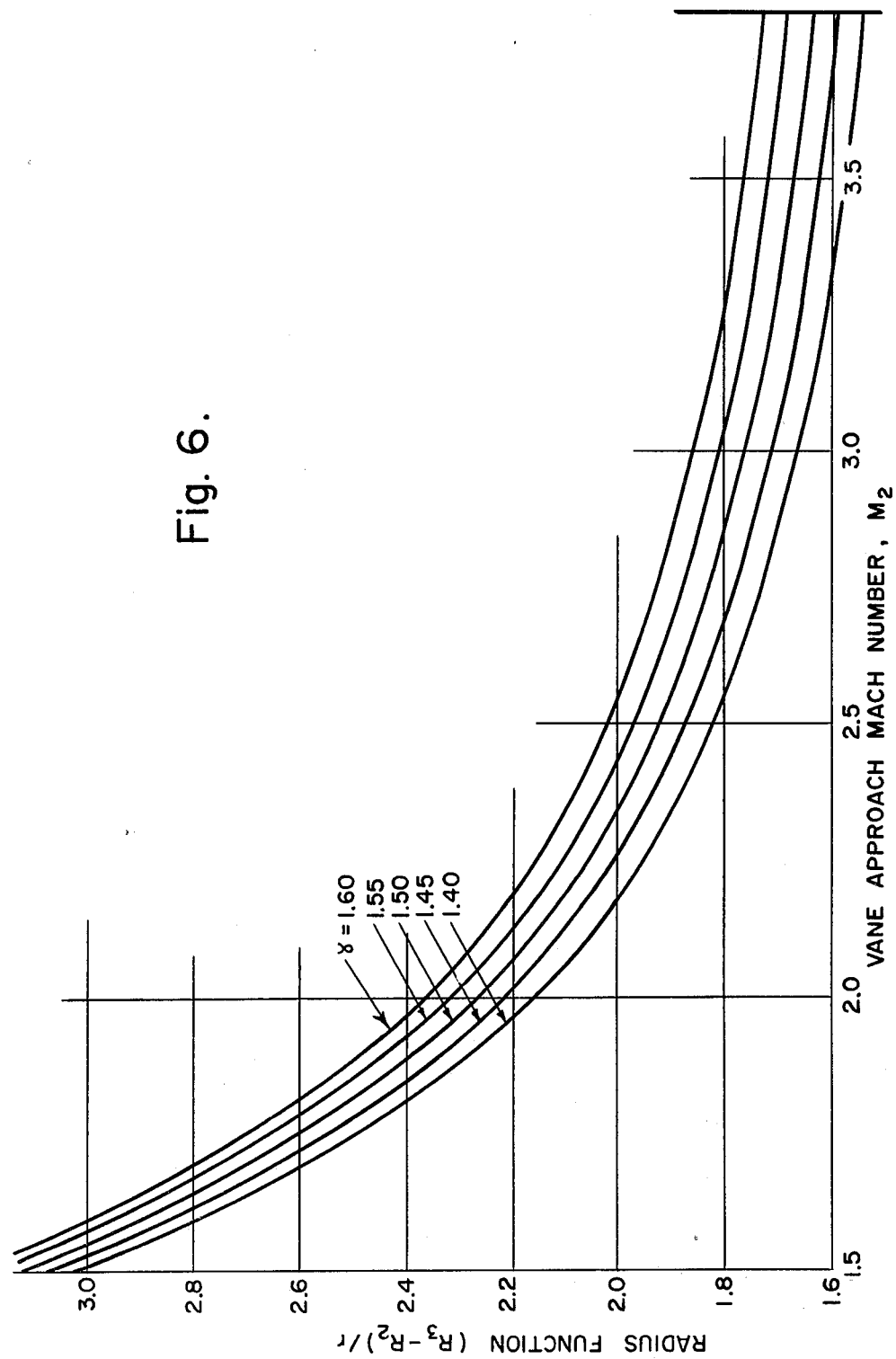
FIG. 6 is a plot of Mach number ($M_2$) versus the radius function ($R_3 - R_2$)/r for a number of different fluids having differing heat capacities.

FIG. 6 illustrates the functional relationship between $M_2$ and the radius function $(R_3 - R_2)/r$ for a number of different fluids having different specific heat capacities: a rather complex equation obtained through a fairly lengthy and complicated derivation. Accordingly, in the interest of avoiding undue and unnecessary complication of the present patent application, the derivation of the radius function equation will not be presented here but, rather, FIG. 6 is used in its stead. From FIG. 6 and the value of $M_2$ calculated from the above area ratio function, $(R_3 - R_2)/r$ is determined for the particular fluid of interest.

Once again, through an extensive derivation, it can be shown that the minimum value of S (the separation distance between adjacent vanes) may be represented by $$S_{min} \frac{N}{R_2} = (\frac{2}{\gamma+1})^{\frac{\gamma+1}{2(\gamma-1)}} 2\pi M_2^{\frac{\gamma+1}{1-\gamma}} (1 + \frac{\gamma - 1}{2} M_2^2)^{\frac{1}{2}} (\gamma M_2^2 - \frac{\gamma - 1}{2})^{\frac{1}{\gamma-1}}$$

so that $S_{min} N/R_2$ can be determined.

Figure 5:
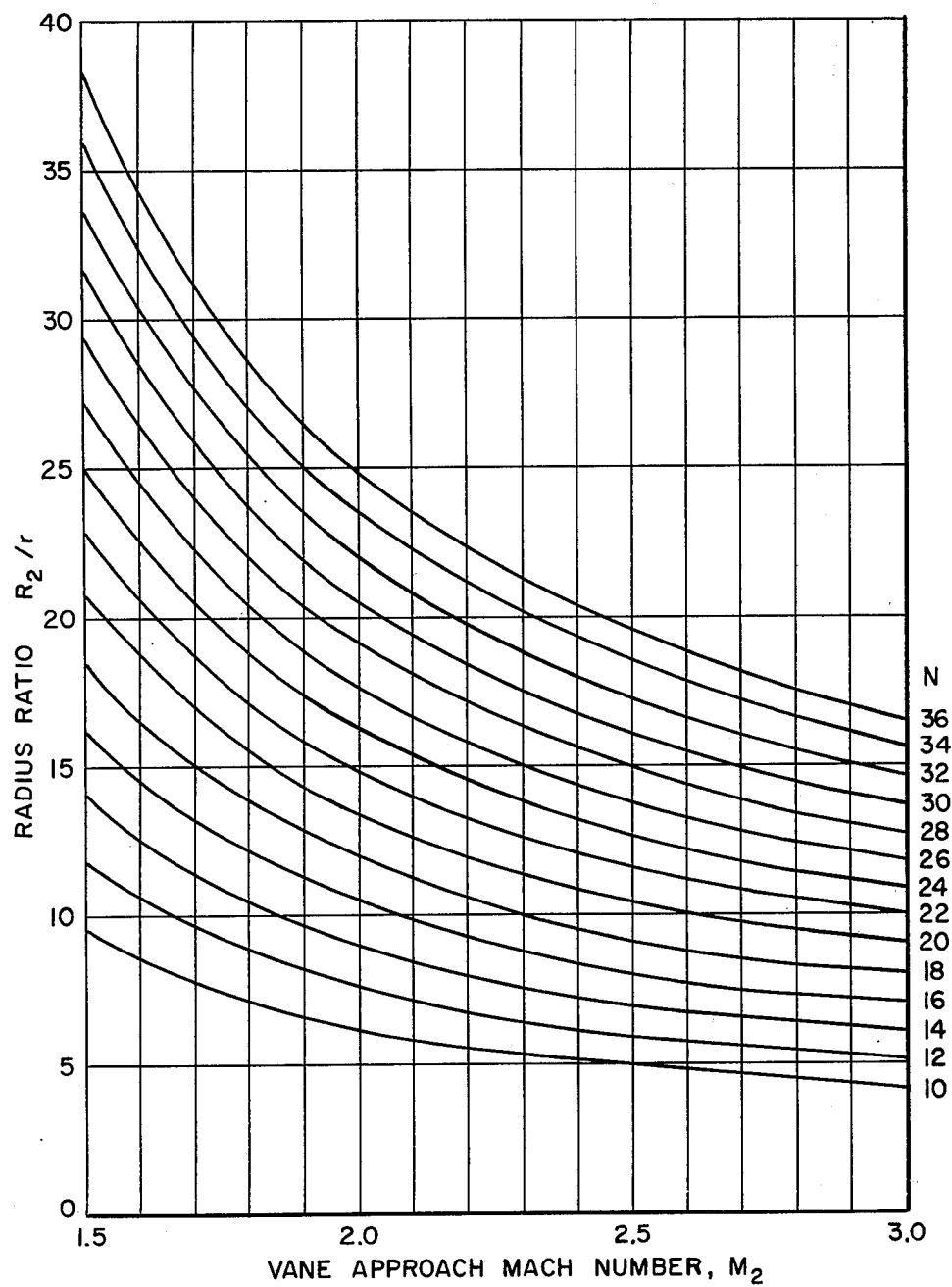
FIG. 5 is a plot of Mach number ($M_2$) versus Radius ratio ($R_2$)/r showing a family of characteristic curves for different numbers of diffuser vanes (N) and for gas having a specific heat ratio of 1.40.

If now an integral number of vanes N is selected, the characteristic curves shown in FIG. 5 may be used to determine $R_2/r$ which may be used in turn to find $R_3/r$ from the previously determined value of $(R_3-R_2)/r$ and the relationship $$\frac{R_3}{r} = \frac{R_3 - R_2}{r} + \frac{R_2}{r}.$$

Once $R_3/r$ is determined, the relationship $$\frac{SN}{R_3} = 2\pi - 4N \sin^{-1}\left(\frac{r}{2R_3}\right)$$

may be used to find $SN/R_3$ which in turn is used in the relationship $(SN/R_2)=(SN/R_3)(R_3/R_2)$ where $R_3/R_2$ is found by dividing previously found $R_3/r$ by $R_2/r$. Finally, $SN/R_2$ is compared to $S_{min}(N/R_2)$ to determine if the solution reached is an acceptable one.

In a specific example using the above procedure, it can be shown that $SN/R_2=5.476$ is an acceptable solution where $S_{min}(N/R_2)=5.30$ and $R_2=20.9$, $M_2=1.87$, $\gamma=1.41$, $N=10$, $R_3=28.05$ and $r=3.096$.

While a preferred embodiment has been disclosed and described and a specific example presented, it should be recognized that the invention should not be considered to be limited thereby. Accordingly, while the cylindrical laser application is the most suitably known application for the diffuser at the present time, there are any number of other practiced applications to which the invention may be applied other than a cylindrical laser. For example, the diffuser may be used to advantage in any application having a cylindrically expanding supersonic flow. Furthermore, the broad principle of establishing a coalesced upstream detached bow shock wave by a plurality of blunt profiled flow obstructions for the purpose of causing the supersonic to subsonic transition across a substantially normal shock may be used in other radially expanding flows. Such flows might take the form of a spherical expansion such as may exist at the exit end of a rocket nozzle at the terminal end of a simple duct or at the point of transition between a duct of a first smaller dimension to a second, larger dimension. Furthermore, while the embodiment disclosed has utilized a plurality of air-foil like vanes, it is deemed that the invention as claimed should not necessarily be so limited.

What is claimed is:

1. An apparatus for diffusing a radially expanding fluid from a supersonic flow to a subsonic flow thereof, which comprises a housing having a central region receiving radially outwardly expanding supersonic flow of fluid and also having a fluid outlet, and means disposed in the path of said radially expanding fluid in surrounding relation to said central region for generating an uninterrupted, coalesced series of detached bow shock waves upstream therefrom and for controlling the flow of fluid therethrough to said outlet.

2. The diffusing apparatus as recited in claim 1 characterized in that said means for generating comprises a plurality of angularly spaced members profiled to establish said coalesced shock wave.

3. The diffusing apparatus as recited in claim 2 characterized by further including a plurality of tapered structures extending downstream of said angularly spaced members, said tapered structures defining a plurality of subsonic diffusion channels.

4. The diffusing apparatus as recited in claim 2 wherein said plurality of angularly spaced members are separated one from another sufficiently to prevent choking of the flow of the fluid therebetween but close enough for the detached bow shock waves established thereby to coalesce into a shock wave which is substantially normal to fluid flow.

5. The apparatus as recited in claim 2 characterized in that each of said members is profiled to have a blunt leading surface and includes a passage therethrough for coolant.

6. The apparatus as recited in claim 2 wherein said housing is a cylinder having an axial dimension and said plurality of angularly spaced members are radially outwardly extending airfoil like vanes whose axial dimension is substantially equal to said axial dimension of said cylinder.

7. The apparatus as recited in claim 6 further including means for causing said radially expanding fluid to converge in the axial direction between said members.

8. The apparatus as recited in claim 7 wherein the ratio of the outlet area of said members to their inlet area has a value less than three.

9. A diffuser for a cylindrical laser of the type having a cylindrical housing having an outlet and a central cylindrical nozzle for creating a cylindrical, radially expanding, supersonic flow of fluid so as to establish an axially extending cylindrical lasing zone within a supersonic flow region surrounding said nozzle but spaced radially inwardly of the housing, the diffuser comprising:

a plurality of angularly spaced flow obstruction means surrounding said nozzle for causing the formation of a substantially cylindrical, perimetrically continuous shock wave downstream of said lasing zone but upstream of said flow obstruction means, said shock wave being completely detached from said flow obstruction means whereby said supersonic fluid flow is transformed from a radially expanding supersonic flow to a radially expanding subsonic flow while traversing said shock wave.

10. The cylindrical laser diffuser as recited in claim 9 wherein said diffuser includes a plurality of tapered structures extending downstream of said flow obstruction means to define a plurality of radially extending subsonic diffusion channels.

11. The cylindrical laser diffuser as recited in claim 10 further including means for causing said radially expanding subsonic flow to converge in the axial direction within said diffuser.

12. The cylindrical laser diffuser as recited in claim 11 wherein said means for causing said radially expanding flow to converge in the axial direction comprises conical end walls on said housing.

13. The cylindrical laser diffuser as recited in claim 10 further including means for causing the value of the ratio of outlet area to inlet area for each of said subsonic diffusion channels to be equal to or less than three.

14. A method of diffusing a supersonic flow to a subsonic flow, the steps of the method comprising;
radially expanding the supersonic flow;
forming a plurality of detached bow shock waves at angularly spaced locations within said radial expansion; and
forming a continuous shock wave substantially normal to fluid flow in said radial expansion by coalescing said plurality of detached bow shock waves whereby said supersonic flow is transformed to a subsonic flow while traversing said shock wave.

15. The method of diffusing a supersonic flow to a subsonic flow as recited in claim 14 wherein said step of forming a plurality of detached bow shock waves includes the step of disposing a plurality of flow obstructing means in said radial flow, each flow obstructing means having a blunt leading edge.

16. The method of diffusing a supersonic flow to a subsonic flow as recited in claim 14 further comprising the step of causing said subsonic flow to diffuse by passing said subsonic flow through a radially divergent subsonic flow diffuser.

17. The method of diffusing a supersonic flow to a subsonic flow as recited in claim 16 wherein said subsonic flow is caused to undergo an axial compression while passing through said radially divergent subsonic flow diffuser.

18. The method of diffusing a supersonic flow to a subsonic flow as recited in claim 14 wherein said step of radially expanding the supersonic flow includes the steps of expanding said flow in a cylindrically symmetrical geometry.

19. The method of diffusing a supersonic flow to a subsonic flow as recited in claim 18 further including the simultaneously performed steps of radially expanding and axially compressing said subsonic flow, said radial expansion occurring in a plane normal to the axial compression.

20. Apparatus for abruptly terminating supersonic flow of a fluid to establish subsonic flow thereof, comprising in combination:

housing means for defining a flow path for a high energy fluid and including an inlet region receiving fluid travelling at supersonic velocity and an outlet region for discharging the fluid; and shock generating means separating said inlet and outlet regions for establishing an abrupt transition from supersonic to subsonic fluid flow, said shock generating means comprising a plurality of vanes disposed in spaced relation to each other transversely of the fluid flow direction between said inlet and outlet regions, each vane having a blunt leading edge which creates a bow shock detached from such leading edge in the upstream direction of fluid flow, and said vanes being disposed sufficiently close to one another such that the sonic lines, which do not exist but which would emanate from each vane if such vane were present alone in the fluid flow path, would intersect with similar sonic lines of adjacent vanes in spaced, downstream relation to said bow shocks, whereby said bow shocks coalesce to form an uninterrupted shock front whereat supersonic flow exists immediately upstream thereof whereas only subsonic flow exists immediately downstream thereof.

21. Apparatus as defined in claim 20 wherein said housing is cylindrical and said inlet region is disposed centrally thereof.

* * * * *